United States Patent [19]

Veitenhansl et al.

[11] Patent Number: 4,865,768

[45] Date of Patent: Sep. 12, 1989

[54] PHOSPHORIC ACID SALT OF THE REACTION PRODUCT OF A MONO-CARBOXYLIC ACID WITH A POLYAMINE

[75] Inventors: Rudolf Veitenhansl, Haan; Wolfgang Froeschke, Wuppertal; Peter Waltenberger, Hollig; Guenter Uphues, Monheim, all of Fed. Rep. of Germany

[73] Assignee: Henkel Kommanditgesellschaft auf Aktien, Duesseldorf, Fed. Rep. of Germany

[21] Appl. No.: 3,109

[22] Filed: Jan. 14, 1987

[30] Foreign Application Priority Data

Jan. 23, 1986 [DE] Fed. Rep. of Germany ....... 3601846

[51] Int. Cl.[4] .......................... C07F 9/10; C06M 1/02

[52] U.S. Cl. ...................................... 260/403; 8/127.1

[58] Field of Search ........................................ 260/403

[56] References Cited

U.S. PATENT DOCUMENTS

| | | | |
|---|---|---|---|
| 2,340,881 | 2/1944 | Kelley et al. | 252/8.8 |
| 3,454,494 | 7/1969 | Clark et al. | 252/8.8 |
| 4,456,554 | 6/1984 | Walz et al. | 260/403 |

FOREIGN PATENT DOCUMENTS

| | | |
|---|---|---|
| 038862 | 11/1981 | European Pat. Off. . |
| 188242 | 7/1986 | European Pat. Off. . |
| 1922046 | 4/1969 | Fed. Rep. of Germany . |
| 1922047 | 4/1969 | Fed. Rep. of Germany . |

OTHER PUBLICATIONS

Abstract of E.P.O. 188,242, 7/23/86.

*Primary Examiner*—Anton H. Sutto

*Attorney, Agent, or Firm*—Ernest G. Szoke; Henry E. Millson; Real J. Grandmaison

[57] ABSTRACT

The resistance to yellowing of fabric treatment agents obtainable by reaction of aliphatic $C_8$–$C_{22}$ mono-carboxylic acids or amide-forming derivatives thereof with polyamines and subsequent neutralization of unreacted amino groups is vastly improved by carrying out neutralization with phosphorous acid.

4 Claims, No Drawings

PHOSPHORIC ACID SALT OF THE REACTION PRODUCT OF A MONO-CARBOXYLIC ACID WITH A POLYAMINE

BACKGROUND OF THE INVENTION

1. Field of the Invention

This invention relates to non-discoloring fabric treatment agents based on condensation products of carboxylic acids or carboxylic acid derivatives with polyamines, to a process for their production, and to their use. In the context of the invention, fabric treatment agents are understood to be products which may be used in preparations for finishing fibers, yarns, knitted fabrics, woven fabrics or nonwovens, in detergents, and in aftertreatment preparations for washed fabrics.

2. Statement of Related Art

Various compounds and mixtures of compounds have been proposed for the treatment of textile fibers, yarns, or knitted fabrics, woven fabrics or nonwovens, imparting particularly valuable properties to the fabrics treated with them or forming part of preparations for particularly effective fabric care. The processing properties, the wearing properties of the fabrics, and also their care can be improved, depending on the type of active agents used. U.S. Pat. No. 2,340,881 for example describes condensation products prepared from a hydroxyalkyl polyamine and a fatty acid glyceride. These condensation products improve the smoothness and softness of fabrics treated with them. According to the teachings of this patent, the condensation products are used in the form of aqueous dispersions. U.S. Pat. No. 3,454,494 describes acid salts of fatty acid condensation products with an addition of polyoxyalkylene compounds having a dispersing effect. German Pat. No. 1,922,046 describes detergents containing fatty acid condensation products which, from their production, contain fatty acid partial glycerides having a dispersing effect and which are partly present as salts. These fatty acid condensation products are also described as fabric softeners in German Pat. No. 1,922,047, particularly for liquid fabric aftertreatment preparations. These and similar fabric treatment agents are applied, for example, to fibers, yarns, knitted fabrics, woven fabrics or nonwovens, generally from aqueous dispersion; the substrates mentioned consisting of natural fibers, synthetic fibers and mixtures thereof. Their application is generally followed by a heat treatment for the purpose of drying or fixing. Fabrics thus treated have the advantage over untreated fabrics of improved processibility and/or improved care or wearing comfort. In many cases, however, the heat treatment results in more or less serious discoloration of the treated fabrics.

STATEMENT OF THE INVENTION

Other than in the operating examples, or where otherwise indicated, all numbers expressing quantities of ingredients or reaction conditions used herein are to be understood as modified in all instances by the term "about".

It has now been found that the tendency towards discoloration can be reduced by textile treatment agents obtainable by reaction of (a) aliphatic $C_{10}$–$C_{22}$ monocarboxylic acids or amide-forming derivatives thereof with (b) polyamines and subsequent neutralization of unreacted amino groups with phosphorous acid.

In the context of the invention, amide-forming derivatives of aliphatic $C_{10}$–$C_{22}$ monocarboxylic acids are understood to be the esters derived from natural or synthetic, saturated or olefinically mono- or polyunsaturated, branched or unbranched fatty acids or fatty acid mixtures with lower alkanols (i.e. $C_1$–$C_6$ alkanols, e.g. methanol or ethanol), the fatty acid glycerides and the fatty acid halides. Examples are the derivatives derived from lauric acid, myristic acid, palmitic acid, stearic acid, coconut oil fatty acid, tallow fatty acid, and rapeseed oil fatty acid. The reaction products obtainable therefrom by reaction with polyamines are referred to hereinafter as "fatty acid condensation products" or simply as "condensation products".

Suitable polyamines correspond to the following formula

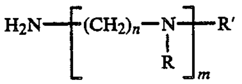

in which R represents hydrogen, methyl, ethyl or hydroxyethyl, R' represents hydrogen, methyl, ethyl, hydroxyethyl or $-(CH_2)_n-NHR$, n is an integer of from 2 to 4, and m is an integer of from 1 to 4. Suitable polyamines are, for example, diethylenetriamine, triethylenetetramine, tetraethylenepentamine, dimethylaminopropylamine, propylenediamine, di(trimethylene)triamine and, in particular, aminoethyl ethanolamine.

The present invention also relates to a process for the production of the fabric treatment agents. In this process, (a) aliphatic $C_{10}$–$C_{22}$ monocarboxylic acids or amide-forming derivatives thereof are heated with (b) polyamines, with separation of the distillate, followed by neutralization of the condensation product with phosphorous acid. The molar ratio of carboxylic acid or carboxylic acid derivative to polyamine is selected so that an excess of amino groups is present. The molar ratio of carboxylic acid to polyamine is from 1:1 to 3:1, depending on the polyamine used. The phosphorous acid used for neutralization with salt formation is used in a stoichiometric quantity or in a substoichiometric or overstoichiometric quantity of up to about 30%, based on unreacted amino groups; in other words, from 0.7 to 1.3, preferably from 1.0 to 1.3 acid equivalents are used per amine equivalent. The neutralization may be carried out in the melt of the condensation product or preferably in acid diluted with water with simultaneous dispersion and dilution to a concentration suitable for marketing, or to the in-use concentration.

In many cases, dispersion may be facilitated by addition of a dispersion accelerator. Suitable dispersion accelerators are, for example, monosaccharides of the aldose and ketose type and hydrogenation products thereof, water-soluble synthetic or natural polymers, alcohol alkoxylates, fatty acid partial glycerides and/or water-miscible solvents. The dispersion accelerators can make up from 0.5 to 70% by weight of the fabric treatment agent.

In the preparation of the condensation product, it is best to work in an inert gas atmosphere and/or in the presence of a reducing agent where importance is attached to light-colored condensation products. Hypophosphorous acid in small quantities is a successful reducing agent for use in the practice of the invention.

The fabric treatment agents of the invention can readily be applied in aqueous dispersion, for example by any of the methods normally used in the textiles field, such as extraction, immersion-spinning, padding or spraying. Use concentrations (based on 100% active) are generally in the range of 1000 to 10000 ppm, based on the weight of the bath. The present invention also relates to the use of the fabric treatment agents of the invention for finishing fibers, yarns, knitted fabrics, card slivers, combed slivers, woven fabrics or nonwovens.

Where the fabric treatment agents of the invention are used in detergents, they provide for improved detergency and/or have a softening effect on the washed fabrics. Finally, the fabric treatment agents of the invention can also be used as constituents of aftertreatment preparations for washed fabrics to make the fabrics soft and antistatic. The aftertreatment of the washed fabrics can take place as usual during the final rinse or even during drying in an automatic dryer, in which case the washing is sprayed with a dispersion of the agent during drying or the agent itself is applied to a substrate, for example a flexible sheet-form textile material. The products of the invention may differ in their composition according to the type of fabric treatment, i.e. the fatty acid condensation products may contain a more or less large fatty acid component or a fatty acid component with fatty acid residues of different length. Products of the invention containing from 0.7 to 1 fatty acid residue (preferably saturated) containing from 16 to 22 carbon atoms, to one functional group of the polyamine, i.e. an amino or hydroxyl group, have proven to be especially successful for the treatment of fibers and yarns and also for the after-treatment of washed fabrics. The after-treatment preparations of the invention are also eminently suitable for the preparation of fabric softener concentrates which, instead of the usual active-agent concentration of around 5% by weight, have an active-agent concentration of from 10 to 50% by weight. Products intended for use in washing machines are preferably those which contain condensation products of shorter fatty acid residues, i.e. essentially containing from 12 to 16 carbon atoms and from 0.3 to 1 and preferably from 0.3 to 0.5 fatty acid residues per functional group of the polyamine. Particularly good results are obtained with reaction products of this type which are derived from coconut oil fatty acid and dimethylaminopropylamine.

The fabrics treated with the agents of the invention also show a distinctly lesser tendency towards yellowing than fabrics treated with conventional agents when high temperatures, for example of up to 200° C., are used for drying or fixing.

The invention will be illustrated but not limited by the following examples.

EXAMPLES

COMPARISON EXAMPLE 1

A condensation product (acid number <2, melting range 62°-65° C.) was prepared by reacting 839 kg stearin (iodine number 1) and 217 kg aminoethyl ethanolamine under nitrogen at temperatures of up to 200° C. in the presence of 1 kg of 50% by weight hypophosphorous acid as anti-oxidant, the reaction being accompanied by elimination of water. After cooling, the reaction product was stirred at 50° C. into a mixture of 2856 kg of water and 144 kg of 60% by weight acetic acid. A yellowishwhite dispersion (comparison product 1) was obtained.

COMPARISON EXAMPLE 2

1950 kg hardened beef tallow were melted at 95° C. 240 kg aminoethyl ethanolamine were run slowly into the resulting melt which was then stirred for 4 hours at 105° C. After addition of 200 kg polyethylene glycol stearate, 550 kg of 60% by weight acetic acid mixed with 8600 kg of water were pumped into the reaction vessel, followed, after cooling to 65° C., by addition of 10 kg of perfume (comparison product 2).

COMPARISON EXAMPLE 3

Comparison product 3 was prepared in the same way as in Comparison Example 2 from 10.65 kg of hardened beef tallow, 1.3 kg of aminoethyl ethanolamine, 0.65 kg of 70% by weight glycolic acid, 7.5 kg of tallow alcohol + 14 moles of ethylene oxide and 80 kg of water.

COMPARISON EXAMPLE 4

Comparison product 4 was obtained from 2275 kg of hardened beef tallow, 416 kg of aminoethyl ethanolamine, 440 kg of 60% weight acetic acid and 9880 kg of water.

EXAMPLES I TO IV

Products according to the invention were obtained by preparing products in the same way as described above, except that the acetic acid and the glycolic acid were replaced by an equivalent quantity of phosphorous acid. The products thus obtained are called softeners I, II, III and IV. Fabric samples (woven cotton/-polyester blend) were treated by padding with products I to IV according to the invention and with comparison products 1 to 4 in the form of dispersions containing 10 g of product per liter of dispersion. The fabric samples were then heat treated (2 minutes at 120° C. or 180° C.) in a Benz laboratory tenter frame. The color intervals between the samples treated at 120° C. and the samples treated at 180° C. were calculated on the basis of colorimetric measurements. The higher the numerical value, the greater the discoloration.

TABLE

| Product No. | Comparison product | Product according to the invention |
|---|---|---|
| 1 | 2.37 | |
| I | | 1.90 |
| 2 | 1.51 | |
| II | | 1.02 |
| 3 | 1.89 | |
| III | | 1.44 |
| 4 | 3.86 | |
| IV | | 1.57 |

As can be seen from Table 1, the fabrics treated with the conventional agents (1 to 4) discolor to a greater extent than the fabrics treated with the agents according to the invention (I to IV). The differences are so clear that they are visible to the naked eye, i.e. without any need for measuring instruments.

We claim:

1. A phosphorous acid salt of the reaction product of (a) at least one aliphatic $C_{10}$-$C_{22}$ monocarboxylic acid or amideforming derivative thereof with (b) at least one polyamine, wherein the amide-forming derivative of the aliphatic $C_{10}$-$C_{22}$ monocarboxylic acid is an ester with a lower alkanol, a glyceride, or an acid halide, the at least one polyamine forming the reaction product has the following formula:

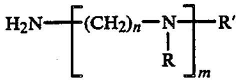

wherein R is hydrogen, methyl, ethyl or hydroxyethyl, R′ is hydrogen, methyl, ethyl, hydroxyethyl or $-(CH_2)_n-NHR$, n is an integer of from 2 to 4, and m is an integer of from 1 to 4, the molar ratio of (a) to (b) is from about 1:1 to about 3:1, and from about 0.3 to about 1 monocarboxylic acid or derivative thereof is present for each functional group in the polyamine, wherein the functional groups are the amine groups and the hydroxy groups.

2. The salt of claim 1 wherein the at least one polyamine is diethylenetriamine, triethylenetetramine, tetraethylenepentamine, dimethylaminopropylamine, propylenediamine, di(trimethylene)triamine or aminoethyl ethanolamine.

3. The salt of claim 1 wherein the at least one aliphatic monocarboxylic acid or derivative thereof contains from 16 to 20 carbon atoms in the acid.

4. The salt of claim 3 wherein from about 0.3 to about 0.5 monocarboxylic acid or derivative thereof is present per each functional group in the polyamine.

* * * * *